United States Patent
Beukema et al.

(10) Patent No.: US 6,920,519 B1
(45) Date of Patent: Jul. 19, 2005

(54) SYSTEM AND METHOD FOR SUPPORTING ACCESS TO MULTIPLE I/O HUB NODES IN A HOST BRIDGE

(75) Inventors: Bruce Leroy Beukema, Hayfield, MN (US); Timothy Carl Bronson, Vestal, NY (US); Ronald Edward Fuhs, Rochester, MN (US); Glenn David Gilda, Binghamton, NY (US); Anthony J Bybell, Carrboro, NC (US); Stefan Peter Jackowski, Endicott, NY (US); William Garrett Verdoorn, Jr., Rochester, MN (US); Phillip G Williams, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/569,059

(22) Filed: May 10, 2000

(51) Int. Cl.⁷ .......................... G06F 13/36; G06F 3/00; G06F 12/00
(52) U.S. Cl. ........................ 710/306; 710/3; 710/38; 710/311; 711/202
(58) Field of Search .................. 710/48, 260, 307, 710/308, 311, 22; 711/206, 144, 170, 154, 202; 709/1; 713/201; 712/228; 370/402

(56) References Cited

U.S. PATENT DOCUMENTS

| 4,719,621 A | * | 1/1988 | May .......................... 370/402 |
| 5,388,217 A |   | 2/1995 | Benzschawel et al. ....... 395/275 |
| 5,428,757 A | * | 6/1995 | Sutton ........................ 709/107 |
| 5,551,053 A |   | 8/1996 | Nadolski et al. ............ 395/829 |
| 5,634,043 A |   | 5/1997 | Self et al. .................... 395/558 |
| 5,649,141 A | * | 7/1997 | Yamazaki .................... 711/206 |
| 5,668,968 A | * | 9/1997 | Wu ............................... 711/3 |
| 5,675,830 A |   | 10/1997 | Satula ........................ 395/829 |
| 5,682,512 A | * | 10/1997 | Tetrick ........................ 711/202 |
| 5,757,642 A |   | 5/1998 | Jones .......................... 364/134 |
| 5,819,061 A | * | 10/1998 | Glassen et al. ............... 709/1 |
| 5,835,738 A | * | 11/1998 | Blackledge et al. ......... 710/307 |
| 5,928,356 A | * | 7/1999 | Golliver et al. .............. 712/228 |
| 5,933,824 A |   | 8/1999 | DeKoning et al. ............. 707/8 |
| 5,953,538 A | * | 9/1999 | Duncan et al. ............... 710/22 |
| 5,983,292 A | * | 11/1999 | Nordstrom et al. ........... 710/54 |
| 5,991,797 A |   | 11/1999 | Futral et al. ................. 709/216 |
| 5,991,859 A | * | 11/1999 | Nagasawa et al. ........... 711/170 |
| 6,003,106 A | * | 12/1999 | Fields et al. ................. 710/308 |
| 6,038,651 A |   | 3/2000 | VanHuben et al. ........... 712/21 |
| 6,078,997 A | * | 6/2000 | Young et al. ................. 711/144 |
| 6,170,025 B1 | * | 1/2001 | Drottar et al. ................ 710/48 |
| 6,189,062 B1 | * | 2/2001 | Jander et al. ................ 710/311 |
| 6,192,455 B1 | * | 2/2001 | Bogin et al. ................. 711/154 |
| 6,295,573 B1 | * | 9/2001 | Bailey et al. ................. 710/260 |
| 6,401,154 B1 | * | 6/2002 | Chiu et al. ................... 710/260 |
| 6,442,694 B1 | * | 8/2002 | Bergman et al. ............. 713/201 |
| 6,466,998 B1 | * | 10/2002 | Bennett ........................ 710/48 |

* cited by examiner

Primary Examiner—Mark H. Rinehart
Assistant Examiner—Christopher E. Lee
(74) Attorney, Agent, or Firm—Shelley M Beckstrand; William H. Steinberg (57) ABSTRACT

Dynamic routing of data to multiple processor complexes. PCI address space is subdivided among a plurality of processor complexes. Translation table entries at each processor complex determine which processor complex is to receive a DMA transfer, thereby enabling routing of DMA data to one I/O hub node while accessing translation table entries at another I/O hub node. Further, interrupt requests may be dynamically routed to multiple processor complexes.

32 Claims, 6 Drawing Sheets

SYSTEM AND METHOD FOR SUPPORTING ACCESS TO MULTIPLE I/O HUB NODES IN A HOST BRIDGE

CROSS REFERENCES TO RELATED APPLICATIONS

U.S. patent application Ser. No. 09/569,574, filed concurrently herewith and entitled "SYSTEM AND METHOD FOR SHARING I/O ADDRESS TRANSLATION CACHING ACROSS MULTIPLE PCI HOST BRIDGES" is assigned to the same assignee hereof and contains subject matter related, in certain respect, to the subject matter of the present application. The above identified patent application is incorporated herein by reference.

BACKGROUND OF THE INVENTION

1. Technical Field of the Invention

This invention pertains to an I/O bus to host bridge in a processor system. More particularly, it relates to a PCI/host bridge apparatus and method providing redundant link connections in support of multiple I/O hubs.

2. Background Art

A host bridge chip as defined by Peripheral Component Interconnect (PCI) Local Bus Specification provides an interconnect between an I/O subsystem and one or more processors in a processing system. (See PCI 2.2 spec: "PCI Local Bus Specification" Revision 2.2, Dated Dec. 18, 1998.)

A PCI host bridge provides an interconnect between an I/O subsystem and one or more processors in a processing system. A host bridge typically provides data buffering capabilities for transferring read and write data between the I/O subsystem and the processors. Read and write commands or transactions that originate on the PCI bus and are destined for system memory are typically referred to as DMAs.

A PCI host bridge may also provide a means for translating addresses from a PCI memory address space to a system memory address space. A host bridge chip may provide a hardware mechanism to fetch table entries from system memory which describe how to map PCI addresses into system memory addresses. The host bridge uses a table entry to determine the system memory location to which a DMA operation will be directed.

The prior art provides support for a host bridge talking to a processor complex through an I/O hub chip over communications links between the host bridge and an I/O hub chip. Redundant communications links are provided to prevent a failure of a single communications link from disrupting communication between a host bridge and I/O hub chip. These communications links can be connected in a ring configuration where multiple host bridge chips and I/O hub chips are connected to the ring. A host bridge is configured to communicate with only one I/O hub chip, however, and must be reconfigured if communications with another I/O hub chip is desired.

It is desirable for certain system configurations to provide the capability to dynamically communicate with other I/O hub chips from the host bridge chip. This configuration improves system reliability by allowing a second processor complex to access an I/O subsystem in the event of a failure of a first processor complex.

Various methods have been proposed and implemented to achieve high availability I/O systems. One such system, described in U.S. Pat. No. 5,682,512, couples several processing nodes together using cluster bridges. The processing nodes comprise a microprocessor, memory and I/O interconnected by a system bus, while the cluster bridges comprise address translation logic as well as interfaces to a processor node via the system bus and one or more other cluster bridges via point-to-point communication lines. The I/O bridges may be PCI-based. The address translation logic takes addresses that correspond to a global address map and remaps them to local addresses if such a mapping exists. The system structure at each node contains one or more processors, memory and I/O. This system does not use address translation during DMA operations when moving from an I/O address space to a system memory address, does not dynamically route DMA operations to a desired processing node, and does not dynamically route interrupts to a desired processor by reusing a portion of the address translation mechanism.

It is an object of the invention to provide an improved I/O system and method.

It is a further object of the invention to provide a cost-effective way of building high availability I/O systems with a high degree of design reuse.

It is a further object of the invention to provide a method for using existing packet-based technology for redundant link connections and extending it to support dynamic access to multiple I/O hubs.

It is an object of the invention to provide access to translation table information residing in one processor complex while transferring data to another processor complex using the translation table information from that other complex.

It is a further object of the invention to provide subdivided PCI address space to determine from which processor complex to fetch translation table information.

It is a further object of the invention to provide dynamic routing of PCI interrupts from a particular PCI bus to different processor complexes (sometimes referred to as I/O hubs).

It is a further object of the invention to provide a system coherency protocol by which coherency is assured for cached translation table information and DMA read data originating from multiple processor complexes.

SUMMARY OF THE INVENTION

In accordance with the invention, a system and a method are provided for dynamically routing data to multiple processor complexes. PCI address space is subdivided among a plurality of processor complexes for the purpose of retrieving translation table information. Translation table entries at each processor complex determine which processor complex is to receive a DMA transfer, thereby enabling routing of DMA data to one I/O hub node while accessing translation table entries at another I/O hub node. Further, interrupt requests may be dynamically routed to multiple processor complexes.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
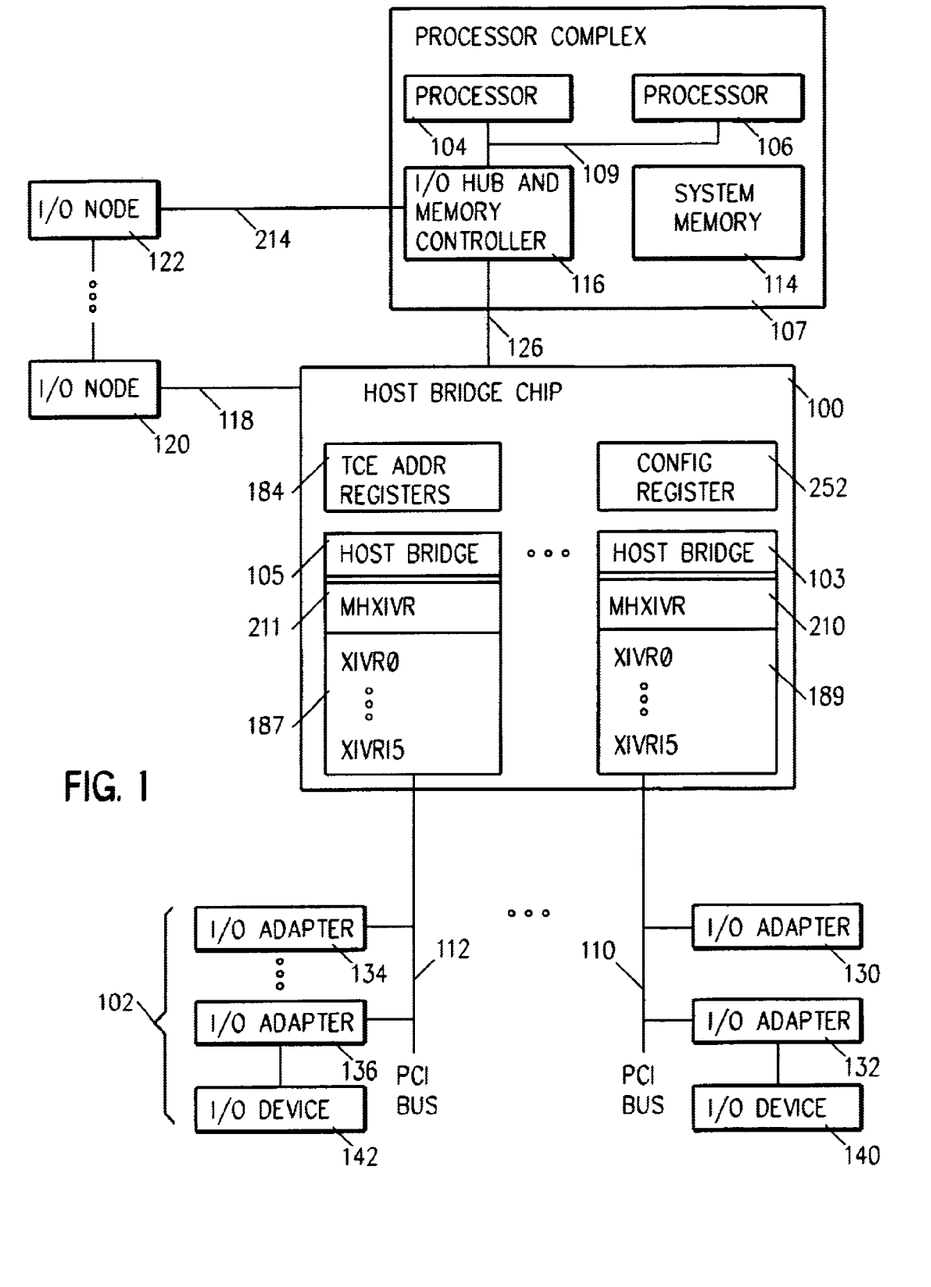
FIG. 1 is a high level system diagram of a host bridge and I/O hub system in accordance with a preferred embodiment of the invention.

Referring to FIG. 1, a PCI host bridge chip 100 may provide a means for translating addresses from a PCI memory 102 address space to a system memory 114 address space. Host bridge chip 100 may also provide a hardware mechanism to fetch table entries from system memory 114 which describe how to map PCI addresses into system memory addresses. For this purpose, host bridge 100 uses a table entry to determine the system memory 114 location to which a DMA operation will be directed.

In this exemplary embodiment, processors 104 and 106 comprise a symmetric multiprocessor (SMP) within processor complex 107. Processor complex 107 also includes a system memory 114, and an I/O hub and memory controller 116 connected to processors 104 and 106 over processor bus 109, connected to system memory 114, and via interface link 126 to host bridge chip 100. Link 126 (as also link 214 and link 118) is a high speed link (HSL), a high-speed interconnect which utilizes a packetized protocol to communicate between the various endnodes. Host bridge chip 100 includes a plurality of host bridges 103, 105, TCE address registers 184, and configuration register 252. Each host bridge 103, 105 is connected to a PCI bus 110, 112, and includes an MHXIVR register 210, 211 and XIVR register 189, 187. One or more I/O adapters 130, 132, 134, 136 interconnect I/O devices 140, 142 to PCI buses 110 and 112. Host bridge chip 100 is connected by link 118 to I/O node 120, thence to I/O node 122, which is connected via link 214 to hub controller 116.

DMA requests are routed from a host bridge chip 100 node to an input/output (I/O) hub 116 over bus or link 126. Multiple host bridge chips 100 can connect in daisy-chain fashion to the I/O hub and memory controller 116 using a packet-based connection protocol. Line 118 from host bridge chip 100 shows a connection to another host bridge or I/O hub. I/O nodes 120 and 122 can be either a host bridge chip node 100 or a processor complex node 107. The last I/O node 122 can be connected over link 214 to a second port on I/O hub 116 to form a ring configuration. Such a ring configuration provides a redundant connection for failover scenarios.

In a prior art configuration, one of I/O nodes 120 or 122 may be another processor complex, but communication from a host bridge chip to one and only one processor complex is allowed, and that is fixed at system configuration time. If a configured communication link to a processor complex is broken, then a reconfiguration is required to establish a new communication path to another complex. Thus, in this prior art configuration, a host bridge chip 100 can be configured to communicate with only one processor complex node 116 even though a physical path may exist to other processor complex nodes, say I/O node 120.

Packets are routed between the host bridge chip 100 and I/O hub chips 116 using source and destination ID fields contained within the packets. In the prior art, each host bridge chip 100 contains a hub ID register (not shown) which identifies the ID of the I/O hub chip 116. The hub ID register is used to fill in the destination ID portion of the packet for DMA requests sent to the I/O hub 116. Interrupt request packets are also routed in a similar manner.

In accordance with the present invention, for certain system configurations, the capability is provided for dynamically communicating with other I/O hub chips 116 which may exist at other I/O nodes 120, 122 from the host bridge chip 100. This configuration improves system reliability by allowing a second processor complex 107 to access an I/O subsystem 102 in the event of a failure of a first processor complex without requiring reconfiguration, that is, dynamically.

An exemplary embodiment of the present invention provides a mechanism for the I/O subsystem 102 underneath a host bridge chip 100 to attach to multiple processor complexes 107 dynamically. For this purpose, the existing host bridge chip 100 ports to link 118, 126 are used to provide access to other I/O nodes 120, 122 (either of which may be a processor complex 107) in a redundant fashion as previously described. Further, traffic may flow simultaneously on both ports (connections to links 126, 118) of a host bridge chip 100 to different processor complexes 107 thereby increasing the bandwidth available to that host bridge chip 100.

Additionally, an exemplary embodiment of the invention provides for accessing translation table entries from processor complex 107 while routing DMA data to another processor complex, say at I/O node 122. This capability provides a means for processor complex 107 to maintain translation tables in local memory 114 while forwarding critical I/O data to other complexes at nodes 120, 122 to provide for failover scenarios.

Further in accordance with an embodiment of the invention, interrupt requests may be routed to multiple processor complexes 107 dynamically. This mechanism is useful for rerouting error interrupts from a device 140 from one processor complex 107 to another (at, say, I/O node 120) when a failure is detected in one processor complex 107. Generally, interrupts are configured to be routed to a given complex, say 107. If the processor complex 107 goes down, then routing information in the host bridge chip 100 is dynamically reconfigured so that the interrupts are now reported to another processor complex at, say, I/O node 120.

Figure 2:
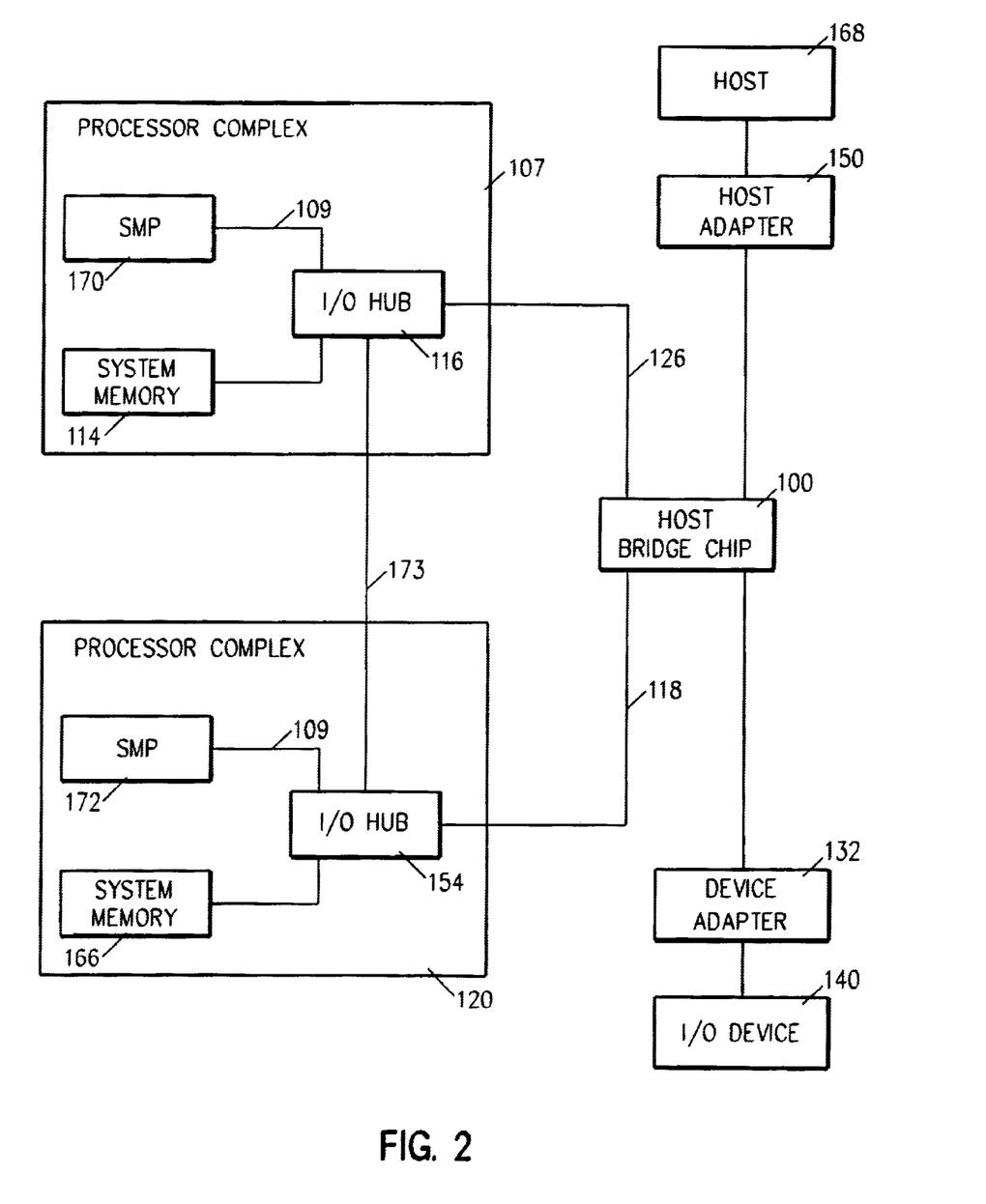
FIG. 2 is a high level system diagram of a high availability I/O subsystem in accordance with a preferred embodiment of the invention.

FIG. 2 shows an high availability I/O system configuration using the capabilities provided by the invention. In FIG. 1, I/O nodes 120, 122 are entities with either host bridges or processor complexes. In FIG. 2, an exemplary embodiment illustrates processor complex 107 connected via link 173 to I/O node 120, also a processor complex. This figure is simplified to show the key ideas of the invention. Host adapter (HA) 150 is connected to a host 168 and to host bridge chip 100. The host bridge chip 100 is in turn connected redundantly over links 118, 126 to two I/O hub chips 154, 116 which are the access points to processor complexes 120, 107 system memory 166, 114, respectively, and a set of symmetric multiprocessors (SMP) 172, 170, respectively. A device adaptor (DA) 132 is also connected to the host bridge chip 100 and to I/O device 140. Although not shown in FIG. 2, redundant DA 132 and HA 150 connections are supported to prevent host bridge 100, DA 132 and HA 150 components from becoming single points of failure in the system. I/O traffic flows between DA 132 and HA 150 under management of the two processor complexes 107, 120. One complex 107 acts as a master for a portion of I/O devices (such as DASD) in the system while the other complex 120 is the slave for that portion.

Writes to a device via DA 132 may be done as "forked" operations, i.e. the write data is sent to both processor complexes 107, 120. The ability provided by the invention to direct DMA operations dynamically to different processor complexes 107, 120 allows the forked write operation to occur. A forked write operation occurs when the same data is written to two separate memories 114, 166 at processor complexes 107, 120 in order to preserve write data if one processor complex fails. The flow for a write operation by a host 168 is from HA 150 to system memory 114 and then from system memory 114 to DA 132. In the event of a failure of processor complex 107, processor complex 120 takes over completion of the write operation by moving the data from system memory 166 to DA 132, thus providing high availability.

This system design prevents a processor complex 107 from being a single point of failure and provides the highly available I/O system, such as the system illustrated in FIG. 2, based on the redundant packet-based ring connection between I/O hubs 116, 154 and host bridge chip 100. Although not shown in the drawing, redundant connections can be made to the host 168 through other host adapters (HA) 150, and redundant connections can also be made to I/O device 140 through another device adapter (not shown) in addition to DA 132. These additional host adapters and device adapters can be attached to a separate host bridge chip 100 anywhere in the ring topology 118, 126, 173.

Features of host bridge chip 100 supporting such configurations are described below in greater detail in connection with a multihub embodiment of the host bridge chip 100 which is operated in accordance with exemplary embodiments of the method of the invention.

Figure 3:
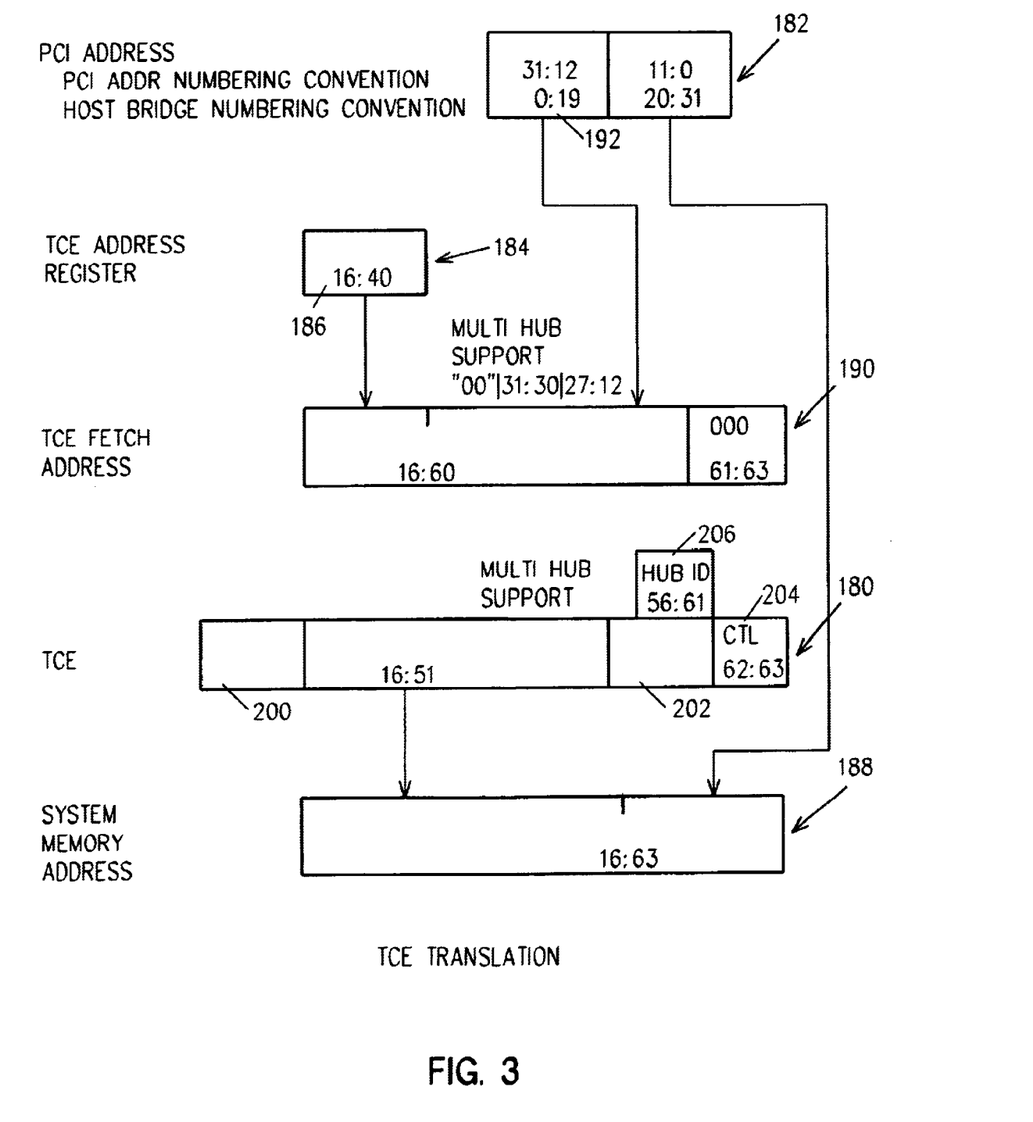
FIG. 3 is a diagram illustrating the process of TCE translation.
Figure 5:
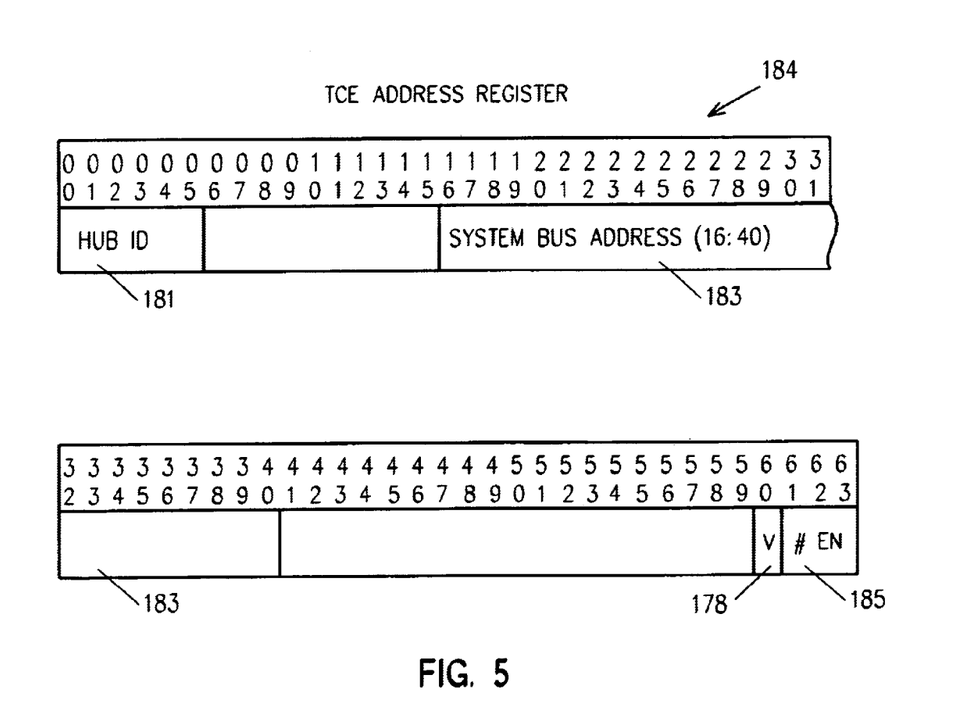
FIG. 5 is a diagram illustraing a TCE address register.

PCI addresses are translated to system memory addresses through translation control entry (TCE) tables maintained in system memory 114. Referring to FIG. 3, an entry in these tables is a translation control entry (TCE) 180. PCI address space is divided into several regions based on PCI address 182 bits 29:28 in the preferred embodiment. These two address bits are used to choose one of four TCE address registers 184 maintained on the host bridge chip 100; each of these registers 184 contains a hub ID field 181 (as shown in FIG. 5) which has a I/O hub node identifier in it. These TCE address registers 184 were previously associated with a PCI host bridge function, but in the multihub mode of the preferred embodiment of the invention are associated with PCI address ranges. This node ID information is used to route a TCE fetch request to a I/O hub 116, 154. This allows a host bridge node 107, for example, to communicate with up to four nodes 120, 122, . . . for fetching TCE table entries 180. More PCI address 182 bits could be used and TCE address registers 184 added to extend the number of supported hubs 107, 120, 122 for TCE fetches.

FIG. 3 shows how a TCE table 180 entry is used to translate a PCI address 182 to a system memory address 188. The content 186 of TCE address register 184 is a pointer to the system memory address origin of the TCE table (one entry 180 of which is illustrated in FIG. 3). When operating without using the multi-hub support of the present invention, the high order 20 bits 192 of a PCI address 182 are concatenated to the contents 186 of TCE address register 184 to form a TCE 8 byte fetch address 190. In accordance with multi-hub support, PCI address 182 bits 29:28 are no longer used in the TCE fetch address 190 formation. Instead, bits 31:30 are shifted two positions to the right (becoming TCE fetch address 190 bits 43:44) and TCE fetch address 190 bits 41:42 are set to zeroes, with the result represented in FIG. 3 by the annotation: "multihub sup- port:"00"|31:30|27:12". A TCE fetch request packet containing this address is sent on link 126 to the appropriate processor complex, say 107, based on a selection using PCI address bits 29 and 28. Bits 29 and 28 select bits bits 0–5 out of one of four TCE address registers 184. These bits identify the appropriate processor complex 107, 120, 122 to which the TCE fetch request is routed.

A TCE 180 is returned from the target processor complex, say 107, to the originating host bridge 100 in a separate response packet across the link 126. While FIG. 2 illustrates only two processor complexes 107, 120, this exemplary embodiment allows for four such complexes which are dynamically selectable through the PCI address 182 bits 29 and 28.

Referring further to FIG. 3, a system memory address 188 is formed with the high order address bits coming from the TCE 180 and the low order bits coming from the original PCI address 182. Field 200 of TCE 180 represents bits that are unused from the TCE (the preferred embodiment supports 48 bits of system memory addressability) and field 202 of the TCE 180 represents reserved bits. Field 204, bits 62:63 of the TCE 180, are control bits that provide page protection capability.

Field 206 which replaces certain bits of TCE 180 shows another modification provided by the invention. Bits 56:61, previously a portion of reserved bits 202 in the TCE 180, are now used as a hub identifier as shown in field 206; the preferred embodiment uses bits 56:61 of the TCE 180 to support a 6 bit hub ID 206, although up to 10 bits are available for other possible embodiments. This hub ID field 206 is used for routing data associated with DMAs routed through the host bridge chip 100 to the appropriate processor complex 107, 120, 122. This hub ID 206 does not have to match the hub ID used to perform the TCE fetch for the DMA operation. The use of a separate hub ID 206 for routing the DMAs as opposed to the TCE fetches allows the TCE tables 180 to reside in a processor complex 107 while the DMA data is routed to a separate processor complex 120. These TCE tables 180 and DMA target memory may reside in either the same or separate system memories 114, 166.

Referring further to FIG. 2, another aspect of the invention is the routing of interrupt request packets to different processor complexes 107, 120. An exemplary embodiment supports 15 interrupt levels for each PCI host bridge function 103, 105. Each interrupt level is controlled through use of XIVR registers 189, 187 which sets the priority level of the interrupt and provides an interrupt server number. The interrupt architecture conforms to the RISC System/6000 PowerPC System Architecture specification 1.39.

Figure 4:
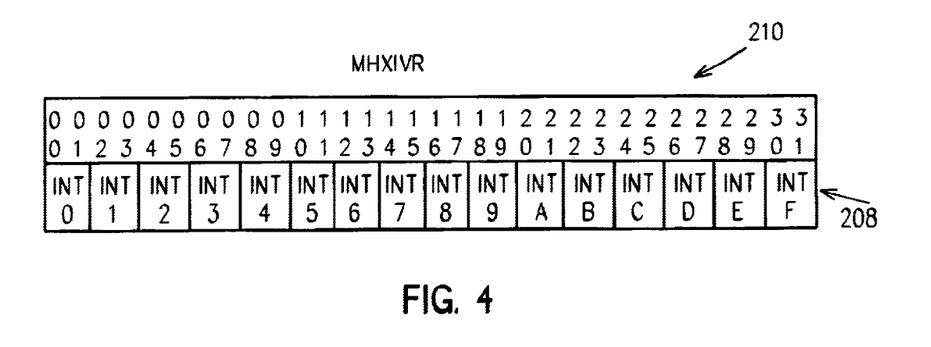
FIG. 4 is a diagram illustrating a MHXIVR register.

Referring to FIG. 4 in connection with FIG. 1, this interrupt architecture is extended in the preferred embodiment to add a separate MHXIVR register 210, 211 which is 32 bits in size. There are 2 bits 208 in register 210, 211 for each interrupt level Int0 through IntF, and these 2 bits point to the appropriate TCE address register 184 hub ID field 181 to select the proper hub I/O node 107, 120, 122 for routing an interrupt packet.

Figure 7:
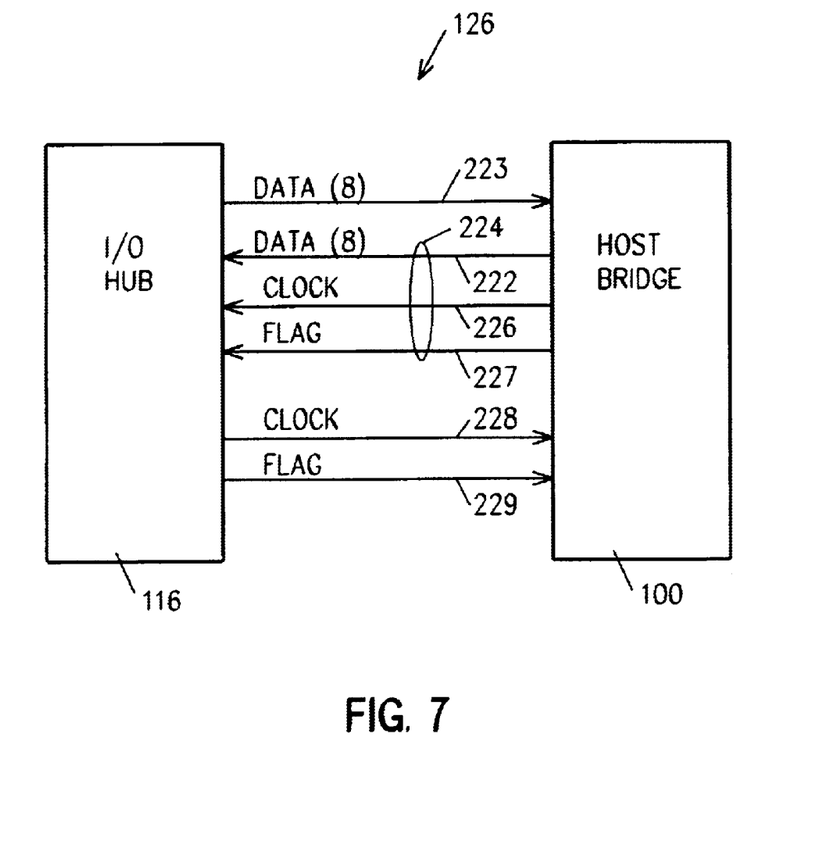
FIG. 7 is a diagram illustrating an I/O hub to host bridge interface.

Referring to FIG. 7, the packet-based interface 126 (FIG. 1) between I/O hub 116 and host bridge 100 chips will be described. Similar interfaces exist on links 118 and 214. Link 126 is a high speed link (HSL), a high-speed interconnect which utilizes a packetized protocol to communicate between the various endnodes. The endnodes which intercommunicate across HSL include processor complexes (sometimes referred to as CEC units) as well as system I/O drawers, and can operate in either a switched fabric or a looped topology. The HSL protocol is capable of supporting alternate, redundant data paths between endnodes with automatic hardware switchover between the alternate data paths. There are twenty logical signals associated with a single interface or link 126. There are two byte-wide data interfaces 222, 223, with data flowing in one direction on each data interface 222, 223 so that a full-duplex connection is established. Each data interface has a clock 226, 228 and flag 227, 229 bit, respectively. The clock 226, 228 provides a sampling reference for arriving data and the flag 227, 229 performs a packet framing function. The link 126 is capable, for example, of a peak data transfer rate of 500 megabytes per second with data transferred with each clock phase.

Figure 6:
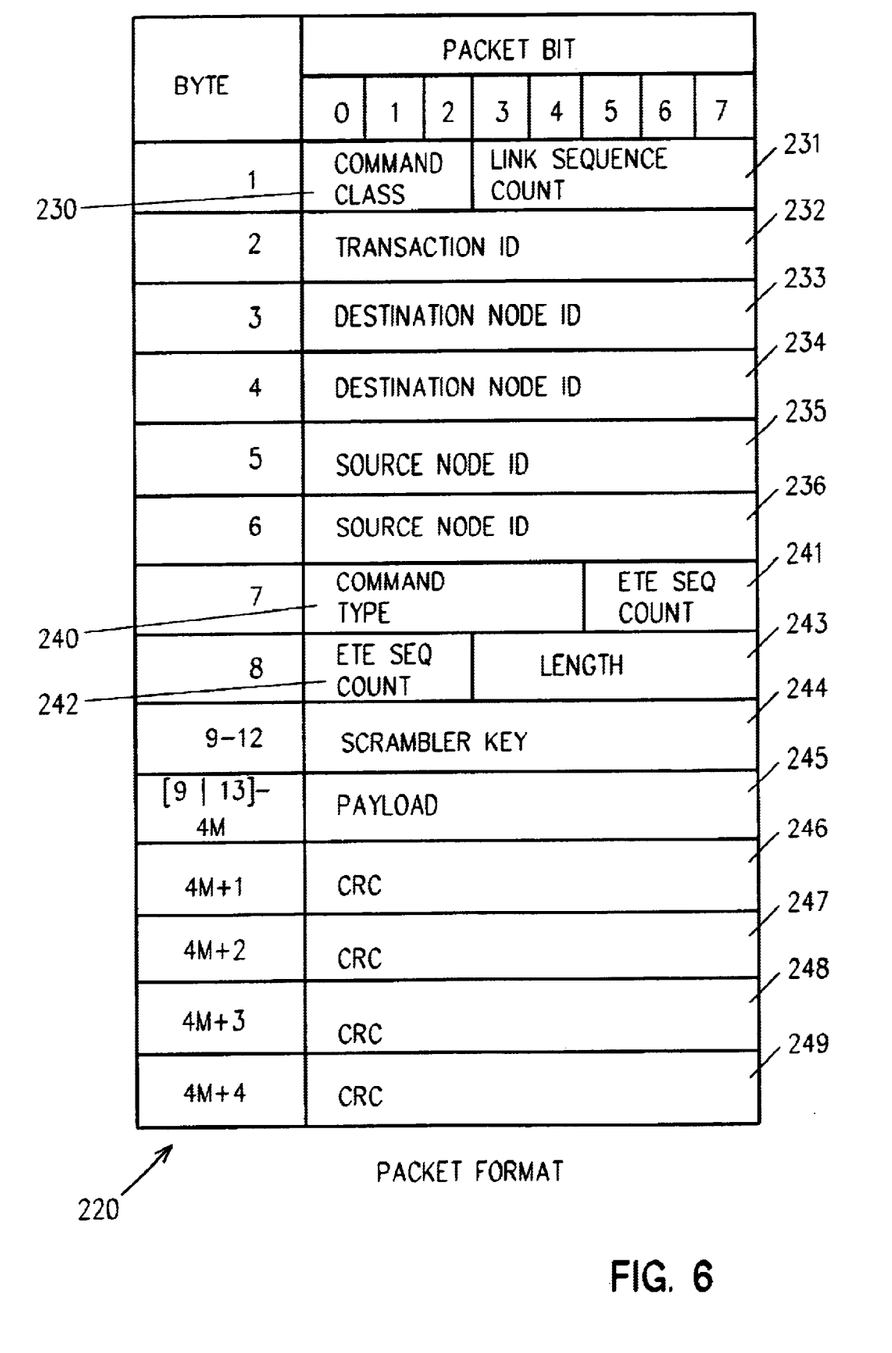
FIG. 6 is a diagram illustrating the format of a packet.

FIG. 6 shows the generalized format of a packet 220 on interface link 126.

Command class field 230 identifies the type of packet. Request packets are used to request read (i.e. DMA read) or write (i.e. DMA write) operations. Response packets are used to respond to read request packets with the requested data. Link acknowledgment packets are used to acknowledge reception of all packets at an adjacent node and are used for flow control between adjacent nodes 107, 122. End-to-end (ETE) acknowledgment packets are used to acknowledge receipt of packets 220 at a destination node and are used for flow control between source and destination node IDs on a HSL network comprised of link 126, 214, 118.

Link sequence count 231 is used for flow control between adjacent nodes; this field is reused as a request link sequence count in a link acknowledgment packet.

Transaction identifier (ID) 232 is used by the initiator to associate a data request with a response that returns the data. This field is reused for link level control bits in a link acknowledgment packet.

Destination node ID 233, 234 is used to indicate the destination for routing a packet. This field is reused as a response link sequence count and additional link level control bits in a link acknowledgment packet.

Source node ID 235, 236 is used to indicate the source of a packet and is used for routing acknowledgment and response packets back to a node.

Command type 240 is used for further delineating request packet types (i.e. read, write) as well as for indicating status on a response packet. This field is not implemented for link acknowledgment packets.

End to end (ETE) sequence count 242 is used for flow control between source and destination nodes. This field is not implemented for link acknowledgment packets.

Length 243 indicates data length for read and write request and response packets.

Scrambler key 244 is used for maintaining an average optical power level only when implementing an optical link.

Payload 245 is the data being delivered in the packet and, in this exemplary embodiment, is in multiples of 4 bytes.

Cyclical redundancy check (CRC) 246–249 provides error checking on the packet 220.

DMA operations initiated by host bridge chip 100 in multihub mode, for example, involving nodes 107, 120 substitute the appropriate node ID 206 into the destination node ID field 233, 234 of a packet 220 for routing DMA read and DMA write operations. For TCE fetch operations, the appropriate node ID 181 is selected and substituted into the destination node ID field 233, 234 of packet 220 for routing the TCE fetch.

Referring to FIG. 6 in connection with FIG. 3, a TCE fetch operation assigns the destination node ID 233, 234 based on a selection of one of four hub IDs from the TCE address registers 184. This selection is based on the PCI address 182 bits 29:28 as previously described. The DMA read and write operations assign the destination node ID 233, 234 based on the hub ID field 206 returned by the TCE fetch operation as previously described. Interrupt request packets 220 assign the destination node ID field 233, 234 based on a selection of one of four hub IDs. This selection is based on the interrupt level and the associated 2 bit value 208 in the MHXIVR register 210.

Referring to FIGS. 4 and 5, the details of the register additions and modifications previously described for multihub mode will be further described. An exemplary embodiment of host bridge chip 100 has four separate domains from which interrupts can originate, three of these are PCI host bridge domains 103, 105, and the other is the host bridge chip 100 itself. Each such domain has a separate MHXIVR register 210, 211 to control routing of each interrupt level to a I/O hub node (such as nodes 107, 120, in FIG. 2.) The host bridge chip 100 domain only implements three interrupt levels (0–2), and so only those bits are implemented in the MHXIVR register 210 for that domain. Each interrupt level has a two bit field 208 which controls selection of the appropriate hub ID value 181 from a TCE address register 184.

Referring to FIG. 5, the TCE address register 184 format includes a valid bit 178 at bit position 60. This bit 178 allows configuration of how many hub ID nodes 107, 120 are supported.

Hub ID field 181 is used to determine the destination node ID for DMA and TCE fetch link packets. When not in multihub mode, this field is set to the same value for all four TCE address registers 184 and is used for both TCE fetches and DMA read and write operations. When in multihub mode, this field 181 is used only for TCE fetches.

en field 185 controls the number of TCE entries 180 supported, or in other words, the size of the TCE table. In an exemplary embodiment, eight encodings are supporting which allow from 8K to 1024K TCE table 180 entries. If a PCI address 182 is generated which causes the supported TCE table size to be exceeded, a TCE extent error occurs. When multihub support is enabled, the maximum number of TCE table entries supported drops from 1024K to 256K, since bits 29:28 of the PCI address 182 are removed from the TCE fetch address formation. Multihub mode bit is added to configuration register 252 as bit 11. When this bit is set, multihub mode is active.

In accordance with an exemplary embodiment of the invention, management for buffered TCE fetch and DMA read data is modified for multihub mode. Block dkills from link 126 are used to manage TCE coherency at a system level. A block dkill is a packet which is used to maintain coherency between system memories 114, 166 and buffered TCE entries 180 in a TCE cache (for an explanation of which, refer to copending U.S. patent application Ser. No. 09/569,574). Hub chip 116 tracks the state of all TCE entries cached within the host bridge chips 100 and issues block dkills when a TCE 180 has been updated in system memory 114. Hub 116 manages cached TCEs in 128 byte blocks, and so a block dkill when issued covers a 128 byte section of system memory representing 16 TCEs 180. Refer to the above referenced copending U.S. patent application Ser. No. 09/569,574 for a detailed description of how block dkills work in bridge chip 100, and for a description of the TCE manager and TCE CAM, to which references are made in the following description.

In accordance with the present invention, the operation of a block dkill is modified in multihub mode as follows: the block dkill address bits 16:40, which is part of the payload 245 of a packet 220 received on link 173, are compared against each of the TCE address registers 184 along with the source ID 235, 236 of the block dkill link packet 220. If any of the TCE address registers 184 match these fields in the block dkill packet 220, a hit indication is generated and the TCE address register 220 that got the hit is encoded into two bits corresponding to PCI address 182 bits 29:28.

Generated bits 29:28 are compared against the same PCI address bits in all entries in the TCE CAM. Block dkill address bits 43:56 are compared against PCI address 182 bits 31:30 & 27:16 in all entries in the TCE CAM. Any TCE CAM entry that matches on both fields is invalidated.

Page dkills are another coherency management protocol supported over link 126 for ensuring that any data modification in system memory 114 results in invalidating stale copies of that data in host bridge chips 100. Hub chip 116 tracks the state of all cached DMA read data within the host bridge chips 100 and issues page dkills when that DMA read data has been updated in system memory 114. The hub manages cached DMA read data in 4096 byte blocks, and so a page dkill when issued covers a 4096 byte section of system memory 114. Each read channel in host bridge chip 100 checks the page dkill address bits 16:40 against the system memory address 188 bits 16:40 recorded for each read channel (see the above referenced copending U.S. patent application Ser. No. 09/569,574 for a description of read channels), and if a hit occurs, that read channel is invalidated. This mechanism remains identical for multihub mode with the exception that an optional hub ID compare is added to the read channels as an additional check before an invalidation occurs. The use of the hub ID compare is configurable based on configuration register 252 bit 15.

Advantages Over the Prior Art

It is an advantage of the invention that there is provided an improved I/O system and method.

It is a further advantage of the invention that there is provided a cost-effective way of building high availability I/O systems with a high degree of design reuse.

It is a further advantage of the invention that there is provided a method for using existing packet-based technology for redundant link connections and extending it to support dynamic access to multiple I/O hubs.

It is a further advantage of the invention that there is provided access to translation table information residing in one processor complex while transferring data to another processor complex using the translation table information from that other complex.

It is a further advantage of the invention that there is provided subdivided PCI address space to determine from which processor complex to fetch translation table information.

It is a further advantage of the invention that there is provided dynamic routing of PCI interrupts from a particular PCI bus to different processor complexes (sometimes referred to as I/O hubs).

It is a further advantage of the invention that there is provided a system coherency protocol by which coherency is assured for cached translation table information and DMA read data originating from multiple processor complexes.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

The exemplary embodiment heretofore described is in accordance with the PCI specification, "PCI Local Bus Specification" Revision 2.2, Dated Dec. 18, 1998. The present invention is also applicable to a PCI-X host bridge. PCI-X is described in "PCI-X Addendum to the PCI Local Bus Specification" Revision 1.0, Dated Sep. 22, 1999. The actual embodiment is PCI, but subsequent chips using this invention may also implement other host bridges, including the PCI-X in addition to PCI.

Accordingly, the scope of protection of this invention is limited only by the following claims and their equivalents.

We claim:

1. An input/output system comprising:
   a host bridge connected by a bus to I/O adapters;
   a plurality of input/output hub nodes;
   means for subdividing address space for said bus among said plurality of input/output hub nodes;
   a translation table containing a plurality of translation table entries at each of a plurality of said hub nodes;
   a translation table entry in said translation table containing a hub ID field for determining which of said hub nodes is to receive a data transfer from said host bridge;
   means for routing of data from an I/O device to one hub node using said hub ID field from said translation table entry while accessing said translation table entry at another hub node using said means for subdividing address space;
   a plurality of registers containing a hub ID field and a system memory address field;
   an address associated with said bus originating from said I/O adapter;
   means responsive to said means for subdividing address space for selecting one of said plurality of registers;
   means responsive to said hub ID field from said selected register for determining which hub node to use for accessing said translation table entry; and
   means for combining said system memory address field from said selected register with a portion of said address for determining a system memory address of said translation table entry in said hub node.

2. The input/output system of claim 1, a plurality of said hub nodes comprising a processor complex.

3. The input/output system of claim 1, further comprising a cache of said translation table entries in said host bridge for dynamically routing data to a plurality of said hub nodes.

4. A method for operating an input/output system including a host bridge and a bus connecting said host bridge to a plurality of input/output hub nodes, comprising the steps of:

operating a translation table containing a plurality of translation table entries at each of a plurality of said hub nodes;

subdividing address space for said bus among said plurality of input/output hub nodes for determining which said hub node and corresponding translation table to use to translate an address;

providing a translation table entry in said translation table for determining which of said hub nodes is to receive a data transfer;

routing data from said host bridge to one hub node responsive to said translation table entry while accessing translation table entries at another hub node responsive to said subdivided address space;

providing a plurality of resisters containing a hub ID field and a system memory address field;

receiving an address associated with said bus originating from said I/O adapter;

responsive to said subdividing address space, selecting one of said plurality of registers;

determining responsive to said hub ID field from said selected register which hub node to use for accessing said translation table entry; and combining said system memory address field from said selected register with a portion of said address for determining a system memory address of said translation table entry in said hub node.

5. An I/O method, comprising:

providing at each of a plurality of processor complexes a translation table containing a plurality of translation table entries;

operating a host bridge to fetch and cache said translation table entries containing hub identifiers and receive input/output data transfer requests;

connecting said host bridge over a bus to said plurality of processor complexes;

subdividing address space for said bus among said plurality of processor complexes for determining which hub node and corresponding translation table will be used to translate a requested address;

said host bridge fetching translation table entries from said complex selected responsive to said subdivided address space;

providing a plurality of registers containing a hub ID field and a system memory address field;

receiving an address associated with said bus originating from an I/O adapter;

responsive to said subdividing address space, selecting one of said plurality of registers;

determining responsive to said hub ID field from said selected register which hub node to use for accessing said translation table entry; and combining said system memory address field from said selected register with a portion of said address for determining a system memory address of said translation table entry in said hub node.

6. A coherency system, comprising:

a plurality of processor complexes, each complex having a translation table containing a plurality of translation table entries;

a plurality of host bridges for fetching and caching said translation table entries and receiving input/output data transfer requests;

a plurality of translation table caches associated with said host bridges;

at least one DMA read module associated with said host bridge;

a plurality of DMA read data sources, at least one said source associated with each said complex;

a coherency protocol for assuring coherency for cached translation table entries and DMA read data originating from at least two of said complexes, with translation data fetched from one said complex used to transfer data with another said complex;

a plurality of resisters containing a hub ID field and a system memory address field;

an address originating from an I/O adapter;

means for subdividing address space for said bus;

means responsive to said means for subdividing address space for selecting one of said plurality of registers;

means responsive to said hub ID field from said selected register for determining which complex to use for accessing said translation table entry; and means for combining said system memory address field from said selected register with a portion of said address for determining a system memory address of said translation table entry within said address space.

7. An I/O system, comprising:

a PCI memory address space;

a system memory address space;

a host bridge node for translating addresses from said PCI memory address space to said system memory address space including
a plurality of registers containing a hub ID field and a system memory address field;
an address originating from an I/O adapter;
means for subdividing address space for said bus;
means responsive to said means for subdividing address space for selecting one of said plurality of registers;
means responsive to said hub ID field from said selected register for determining which complex to use for accessing said translation table entry; and
means for combining said system memory address field from said selected register with a portion of said address for determining a system memory address of said translation table entry within said address space said host bridge node further for fetching translation table entries from a first processor complex node to determine a location in said system memory address space to which a direct memory address operation will be directed to transfer data to a second processor complex node;

said host bridge node, said first processor complex node and said second processor complex node interconnected by a packet-based connection protocol; and means for responding to a failure of said second processor complex node by dynamically reconfiguring access to said first processor complex node due to a failure.

8. The system of claim 7, further comprising:

said host bridge node being further operable for simultaneously flowing data packets to at least two of said host bridge node, first processor complex node and second processor complex node;

said translation table entry containing node identifier fetched by said host bridge node; and means for accessing translation table entries from a first I/O hub on said first processor complex node while routing DMA data responsive to said node identifier from said translation table entry to a second I/O hub on said second processor complex node.

9. An I/O method for transferring packets with respect to PCI memory address space and system memory address space including a plurality of nodes interconnected by a packet-based connection protocol, comprising the steps of:
- operating a host bridge node to translate addresses from said PCI memory address space to said system memory address space, including:
  - providing a translation table containing a plurality of translation table entries at each of a plurality of said nodes;
  - providing a plurality of registers containing a hub ID field and an associated system memory address field;
  - receiving an address associated with said PCI memory address space originating from an I/O adapter;
  - subdividing said PCI memory address space, and responsive to said subdividing, selecting one of said plurality of registers;
  - determining responsive to said hub ID field from said selected register which hub node to use for accessing said translation table entry; and
  - combining said system memory address field from said selected register with a portion of said address for determining a system memory address of said translation table entry in said hub node;
- fetching translation table entries from a first processor complex node for determining a location in said system memory space to which a direct memory address operation will be directed to transfer data to a second processor complex node; and
- responsive to a failure of said second processor complex node, dynamically reconfiguring access to said first processor complex node.

10. A high availability I/O system, comprising:
- a plurality of input/output nodes;
- a host bridge including an input/output adapter with connections to at least one PCI bus;
- a communication link connecting said host bridge to said plurality of input/output nodes;
- said host bridge including a plurality of TCE address registers, each said register associated with a PCI address range on each of said PCI busses and including node ID information; and
- means for responding to said node ID information for fetching TCE table entries for associating PCI address range with a system memory address from system memory at any of a plurality of said input/output nodes, including
  - an address associated with said PCI bus originating from said input/output adapter;
  - a plurality of registers containing a hub ID field and a system memory address field;
  - means for subdividing address space for said PCI bus among said plurality of input/output nodes;
  - means responsive to said means for subdividing address space for selecting one of said plurality of registers;
  - a translation table containing a plurality of translation table entries at each said input/output node;
  - means responsive to said hub ID field from said selected register for determining which input/output node to use for accessing said translation table entry; and
  - means for combining said system memory address field from said selected register with a portion of said address for determining a system memory address of said translation table entry in said input/output node.

11. The system of claim 10, a plurality of said input/output nodes including a processor complex.

12. The system of claim 11, each said processor complex including an input/output hub as a connection point for connecting a multiprocessor and a system memory to said communication link.

13. The system of claim 12, said input/output hub being operable for tracking the state of TCE entries cached with a host bridge and issuing a block dkill packet when a TCE entry has been updated in said system memory.

14. The system of claim 13, said host bridge being operable in response to said block dkill packet for invaliding matching TCE entries at said host bridge.

15. The system of claim 12, said input/output hub being operable responsive to modification of data in said system memory for invalidating stale copies of that data in said host bridge.

16. The system of claim 10, said host bridge further comprising means for forking write operations to at least two of said input/output nodes selectively including processor complexes, system memories, and input/output hubs.

17. The system of claim 10, further comprising a plurality of host adapters, each host adapter for connecting a host to a host bridge connected to said communication link.

18. The system of claim 10, further comprising:
- means for responding to one or more bits from a PCI address by routing a TCE fetch request packet to one of said plurality of input/output nodes.

19. The system of claim 18, further comprising:
- means for responding to one or more bits selected from a TCE entry by identifying an input/output node for routing DMA data.

20. The system of claim 19, further comprising said input/output node for routing DMA data being different from the input/output node to which said TCE fetch request packet is directed.

21. The system of claim 10, said host bridge including an interrupt level control register for routing interrupts to different input/output nodes.

22. The system of claim 10, further comprising:
- means for selectively providing in a destination node identifier field in a packet a node identifier for routing a DMA operation or a node identifier for a TCE fetch operation.

23. The system of claim 22, further comprising means for obtaining said node identifier for said TCE fetch operation from one of a plurality of TCE address registers at said host bridge selected responsive to said PCI address range.

24. The system of claim 23, further comprising means for obtaining said node identifier for said DMA operation from a hub ID identifier returned responsive to said TCE fetch operation.

25. The system of claim 23, further comprising means for obtaining said node identifier for an interrupt from an interrupt register at said host bridge, one such interrupt register maintained for each of a plurality of host bridge domains.

26. A method for operating an I/O system including a plurality of I/O nodes, a host, a host bridge connected to said host, and a communication link connecting said host bridge to said plurality of I/O nodes, comprising the steps of:
- associating each of a plurality of address registers containing node identifier indicia at said host bridge with an address range; and
- responsive to said node ID information, fetching a TCE table entry, said TCE table entry associating a PCI address with a system memory address at any of a plurality of said I/O nodes;

said associating and fetching steps including subdividing said address range among said plurality of I/O nodes;

providing a translation table containing a plurality of translation table entries at each of a plurality of said I/O nodes;

providing a plurality of registers containing a hub ID field and an associated system memory address field;

receiving an address associated with said address range originating from an I/O adapter;

responsive to said subdividing, selecting one of said plurality of registers;

determining responsive to said hub ID field from said selected register which I/O node to use for accessing said translation table entry; and combining said system memory address field from said selected register with a portion of said address for determining a system memory address of said translation table entry in said I/O node.

27. A program storage device readable by a machine, tangibly embodying a program of instructions executable by a machine to perform method steps for operating an input/output system including a plurality of input/output hubs connected to a bus, said method steps comprising:

subdividing address space for said bus among said plurality of input/output hub nodes for determining which hub node and corresponding translation table will be used to translate a requested address;

operating a translation table containing a plurality of translation table entries at each of a plurality of said hub nodes for determining which of said hub nodes is to receive a data transfer;

routing data to one hub node using said translation table entries from said translation table while accessing said translation table entries at another hub node using said subdivided address space for determining location of said translation table entries;

providing a plurality of registers containing a hub ID field and an associated system memory address field;

receiving an address associated with said address range originating from an input/output adapter;

responsive to said subdividing selecting one of said plurality of registers;

determining responsive to said hub ID field from said selected register which input/output hub node to use for accessing said translation table entry; and combining said system memory address field from said selected register with a portion of said address for determining a system memory address of said translation table entry in said input/output hub node.

28. A program storage device readable by a machine, tangibly embodying a program of instructions executable by a machine to perform method steps for operating an I/O system, said method steps comprising:

providing at each of a plurality of processor complex nodes a translation table containing a plurality of translation table entries;

providing a host bridge node connected to said plurality of processor complex nodes over a bus for fetching and caching said translation table entries containing hub identifiers and receiving input/output data transfer requests;

subdividing address space for said bus for determining which hub node and corresponding translation table to use to translate a requested address;

said host bridge fetching said translation table entries from said complex node selected responsive to said subdivided address space by providing a plurality of registers containing a hub ID field and a system memory address field;

receiving an address associated with said bus originating from an I/O adapter;

responsive to said subdividing address space, selecting one of said plurality of registers;

determining responsive to said hub ID field from said selected register which hub node to use for accessing said translation table entry; and combining said system memory address field from said selected register with a portion of said address for determining a system memory address of said translation table entry in said hub node.

29. A program storage device readable by a machine, tangibly embodying a program of instructions executable by a machine to perform method steps for operating an interrupt system, said method steps comprising;

interconnecting a plurality of processor complex nodes and host bridge nodes;

interconnecting an I/O device through an I/O adapter to a host bridge nodes;

setting hub node identifier fields identifying said hub node to send interrupt packets;

setting pointer fields, said pointer fields pointing to said hub node identifier fields and being identifiable with different interrupt levels; and said setting steps including providing a plurality of registers containing a hub ID field and a system memory address field;

receiving an address associated with said bus originating from said I/O adapter;

subdividing address space, and responsive to said subdividing address space selecting one of said plurality of registers;

providing at each of said plurality of processor complex nodes a translation table containing a plurality of translation table entries;

determining responsive to said hub ID field from a selected register which hub node to use for accessing said translation table entry; and combining said system memory address field from said selected register with a portion of said address for determining a system memory address of said translation table entry in said hub node;

routing interrupts from said host bridge node responsive to said pointer fields selectable by interrupt level and said hub node identifier fields selectable by said pointer fields to dynamically determine routing of interrupts from said I/O device to a dynamically selected one of said plurality of processor complex nodes.

30. A program storage device readable by a machine, tangibly embodying a program of instructions executable by a machine to perform method steps for transferring packets with respect to PCI memory address space and system memory address space including a plurality of nodes, said method steps comprising:

operating a host bridge node to translate addresses from said PCI memory address space to said system memory address space, including:

providing a translation table containing a plurality of translation table entries at each of a plurality of said nodes;

providing a plurality of registers containing a hub ID field and an associated system memory address field;

receiving an address associated with said PCI memory address space originating from an I/O adapter;

subdividing said PCI memory address space, and responsive to said subdividing, selecting one of said plurality of registers;

determining responsive to said hub ID field from said selected register which hub node to use for accessing said translation table entry; and combining said system memory address field from said selected register with a portion of said address for determining a system memory address of said translation table entry in said hub node;

fetching translation table entries from a first processor complex node for determining a location in said system memory space to which a direct memory address operation will be directed to transfer data to a second processor complex node;

interconnecting said host bridge node, said first processor complex node and said second processor complex node by a packet-based connection protocol; and responsive to a failure of said second processor complex node dynamically reconfiguring access to said first processor complex node.

31. A program storage device readable by a machine, tangibly embodying a program of instructions executable by a machine to perform method steps for operating an I/O system including a plurality of I/O nodes, a host, a host bridge connected to said host, and a communication link connecting said host bridge to said plurality of I/O nodes, said method steps comprising:

associating each of a plurality of address registers at said host bridge with an address range; and responsive to node ID information, fetching a TCE table entry, said TCE table entry associating a PCI address with a system memory address at any of a plurality of said I/O nodes;

said associating and fetching steps including
subdividing said address range among said plurality of I/O nodes;
providing a translation table containing a plurality of translation table entries at each of a plurality of said I/O nodes;

providing a plurality of registers containing a hub ID field and an associated system memory address field;

receiving an address associated with said address range originating from an I/O adapter;

responsive to said subdividing, selecting one of said plurality of registers;

determining responsive to said hub ID field from said selected register which I/O node to use for accessing said translation table entry; and combining said system memory address field from said selected register with a portion of said address for determining a system memory address of said translation table entry in said I/O node.

32. A computer program product or computer program element for operating a computer according to the steps of:

providing at each of a plurality of processor complexes a translation table containing a plurality of translation table entries;

providing a host bridge connected to said plurality of processor complexes by a bus for fetching and caching said translation table entries containing hub identifiers and receiving input/output data transfer requests;

subdividing address space for said bus among said plurality of processor complexes for determining which hub node and corresponding translation table to use to translate a requested address;

said host bridge fetching said translation table entries from said complex selected responsive to said subdivided address space by providing a plurality of registers containing a hub ID field and a system memory address field;

receiving an address associated with said bus originating from an I/O adapter;

responsive to said subdividing address space, selecting one of said plurality of registers;

determining responsive to said hub ID field from said selected register which hub node to use for accessing said translation table entry; and combining said system memory address field from said selected register with a portion of said address for determining a system memory address of said translation table entry in said hub node.

* * * * *